United States Patent [19]

Gray

[11] Patent Number: 5,437,506
[45] Date of Patent: Aug. 1, 1995

[54] SYSTEM FOR MEASURING THE TRANSFER TIME OF A SOUND-WAVE IN A GAS AND THEREBY CALCULATING THE TEMPERATURE OF THE GAS

[75] Inventor: Antonio Gray, Segrate, Italy

[73] Assignee: ENEL (Ente Nazionale per l'Energia Elettrica) & CISE S.p.A., Italy

[21] Appl. No.: 978,709
[22] PCT Filed: Jun. 4, 1992
[86] PCT No.: PCT/EP92/01244
§ 371 Date: Feb. 5, 1993
§ 102(e) Date: Feb. 5, 1993
[87] PCT Pub. No.: WO93/00577
PCT Pub. Date: Jan. 7, 1993

[30] Foreign Application Priority Data

Jun. 24, 1991 [IT] Italy .................. MI91A1729

[51] Int. Cl.⁶ ............................. G01K 11/24
[52] U.S. Cl. .................... 374/119; 73/597; 364/557
[58] Field of Search ............... 73/632, 597; 374/117, 374/119; 364/562, 561, 557; 367/901

[56] References Cited

U.S. PATENT DOCUMENTS

| | | | |
|---|---|---|---|
| 4,095,457 | 6/1978 | Koda et al. ............... | 374/117 X |
| 4,762,425 | 8/1988 | Shakhottai ............... | 374/117 |
| 4,848,924 | 7/1989 | Nuspl et al. ............. | 367/901 X |
| 4,852,263 | 8/1989 | Kerr ....................... | 364/562 |
| 4,935,884 | 6/1990 | Hajicek .................. | 364/562 |
| 5,123,750 | 6/1992 | Ziegler et al. ........... | 374/117 |

Primary Examiner—Diego F. F. Gutierrez
Attorney, Agent, or Firm—Keil & Weinkauf

[57] ABSTRACT

A system for measuring the "time of flight" or transfer time of a sound wave in a gas by using the relation between the gas temperature and the velocity of the sound wave in the gas, and calculating therefrom the temperature of the gas. The system comprises an emitter, which generates a sound which is coherent in phase, at one frequency or a group of frequencies; a self-correlating decoder and a receiver, which is associated with the emitter, and which sends the sound to a filter system and to an assembly controlled by a microprocessor, which processes the signal coming out of the filter system in a shape similar to a Hamming wave shape in order to determine the absolute maximum value and therefrom determine the transfer time. With this knowledge, it is easy to relate the transfer time to the distance traveled between the emitter and receiver and the known properties of the gas, in order to arrive at the temperature of the gas through which the sound has been sent.

5 Claims, 1 Drawing Sheet

SYSTEM FOR MEASURING THE TRANSFER TIME OF A SOUND-WAVE IN A GAS AND THEREBY CALCULATING THE TEMPERATURE OF THE GAS

BACKGROUND OF THE INVENTION

1. Field of the Invention

The present invention concerns a system for measuring the transfer time of a sound-wave, in particular for continuously measuring the transfer time of a sound-wave through a gas which is in a state of turbulence at a high temperature, and in such cases as involve a corrosive environment, with the ultimate goal of continuously measuring the temperature. The invented system is also suited to measuring other associated parameters of the said transfer time within a body, such as its relative velocity or distance from a determined reference point.

2. Description of the Prior Art

For the measurement of the temperature of a gas, the state of the art includes the use of conventional pyrometers such as thermocouples and thermoresistors but also more advanced systems which utilize the existing relation between the velocity of sound propagation through a gas and the temperature of this gas: an emitter is stimulated by a suitable electric signal and generates an acoustic vibration in the gas, while a microphone suitably placed relative to the emitter receives the said vibrations which are then transformed into electrical signals.

The transmitted signals and received signals are compared by appropriate algorithms to provide the so called "time of flight", or transfer time that is the time which the signal emitted by the emitter takes to arrive at the microphone. From this transfer time one is able to ascertain the average temperature of the gas passed through by the acoustic vibration.

The more advanced of the systems are of two different types: those which use a commercial type "spark-gap" device to generate the sound with a single pulse, at high voltage and high current, and those which use a siren, such as those used at sports stadiums to generate the sound. With the first type of system a packet of waves without a well defined frequency or phase is emitted, and one attempts to correlate the time of arrival of the envelope of received signals with the instant of emission of the electrical pulse excited by the "spark-gap", while with the second type of system a wave train of variable and well repeatable frequency is emitted, but with intrinsic incoherence of phase, and a real and proper "cross correlation" between the wave shape of the emitted signal and the wave shape of the received signal is performed.

The disadvantages of conventional pyrometers (thermocouples, thermoresistors, etc) are found in applications where one wants to measure an average temperature, in the necessity of using many of them and in subsequently taking the average, and in the difficulty of their use in hot and very corrosive environments. The disadvantages of pyrometers of an acoustic type for the measurement of the transfer time lie principally in the uncertainty of an exact determination of the transfer time at the very moment one is measuring the temperature of a gas in the presence of raised noise levels produced by the turbulence of the gas, by a burner, by structural vibrations and the like (in the case of the "spark-gap" the uncertainty derives from the fact that the emitted signal is a non-repeatable signal and so its decoding is affected by measurement statistic, while in the second case the cross-correlation between the emitted and the received signals is not very efficient in the presence of the noise and echoes associated with turbulence); in the most favorable of conditions one can obtain a measurement of the accuracy of the estimate of the transfer time in the order of the median period of the emitted wave, which is unsatisfactory in the majority of cases (for example, with f=2000 Hz, the median period and therefore the precision of the measurement is about $\pm 0.5$ milliseconds and this gives uncertainties in the order of $\pm 100°$ C. in paths of about 10 m in an environment at a temperature of about 1000° C.).

SUMMARY OF THE INVENTION

The present invention solves the problem of providing a precise measurement of the temperature of a gas under conditions of high temperature and in the presence of high noise levels.

The invented system still uses the aforementioned relationship between the transfer time and temperature, and includes a sound emitter sensitive to a single or to a group of frequencies, is coherent in phase and is associated with (or also functions as) a self-correlating receiver decoder. This is realized by a means conventionally referred to as a "horn", in which a transducer and a true horn are associated to produce an emitter or a receiver or even a combination emitter/receiver. This allows the relationship between the emitted sound and the background noise to be optimized, since all the energy of the emitted sound is concentrated in a very narrow band of appropriate frequencies; the transducer converts the received sound into electric signals which are sent through a very highly stable narrow band-pass filter system. Then the filter system carries out action of strong correlation to eliminate any possible noise placed on the incoming signal.

The system of filters can be made up, alternatively or in combination, of:

analog filters
commuted condenser filters
digital signal processors.

In addition it is easy to observe that the signal which leaves the system of filters associated with the aforementioned emitter and receiver, represented on an amplitude-time diagram has the particular shape of a "fish" known in the scientific literature as a Hamming wave shape. It has been found that the absolute maximum of the oscillations whose envelope has the fish shape is, from a temporal point of view, very highly correlated with the instant of arrival of the first wave of the received signal. Thus another characteristic of the invention is that having found such correlation it is used to ascertain with certainty the said instant of arrival, and so the transfer time.

An electronic circuit breaker active on the incoming signal to the filter system is driven by an iterating algorithm always to allow the first n waves of the received signal to pass, n being an integer which the user of the system chooses as a function of the conditions of measurements, to avoid processing any signals from echoes and so enabling the system to measure a vast range of temperature without needing to set a trial temperature.

The main advantage of the invention lies in the fact that one can determine with great accuracy the transfer time of a sound-wave and, so, the temperature of a hot gas in a turbulent state in the presence of high background noise and in the presence of the other parameters mentioned in the first paragraph of this description. Another advantage of this invention is that the time resolution of the system is independent from the frequency used.

BRIEF DESCRIPTION OF THE DRAWINGS

The invention will be described in more detail as follows with reference to the attached figures which represent one example of its embodiment and in which.

DESCRIPTION OF THE PREFERRED EMBODIMENTS

Figure 1:
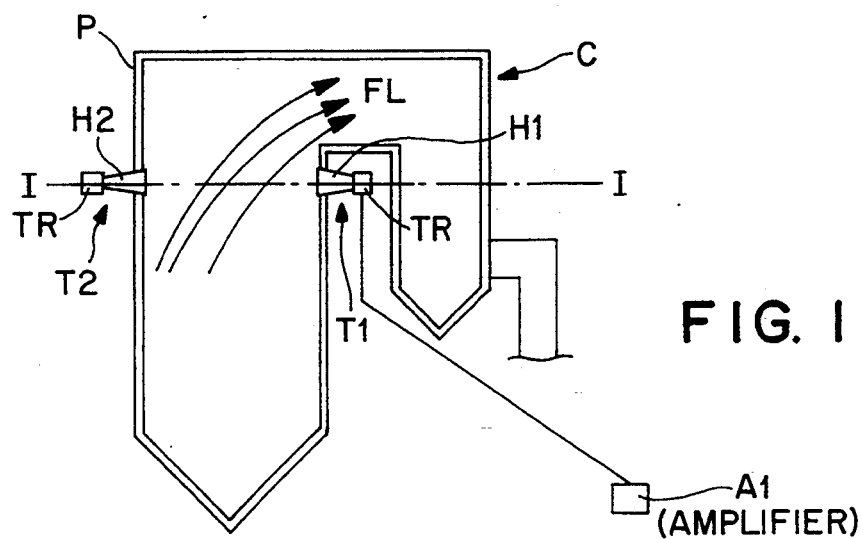
FIG. 1 is a diagrammatic representation of one way of implementing the system.

FIG. 1 shows that in two opposite windows, in the walls P of a boiler C are two facing and identical horns T1, T2 (the horns are to be understood as siren-speakers (produced by the company R.C.F.—Industrie Elettroacusticne a S. Maurizio; Reggio Emilia—model D 140)). The "horns" T1 and T2, each incorporating a transducer TR, have true horns H1 and H2'' aligned along the I—I axis which crosses the heater and the flow of the combustion gas FL.

The horn T2 emits a sinusoidal wave train of 2000 Hz which is received by horn T1 and is then transformed into an electrical signal which is sent to the amplifier A1.

Figure 2:
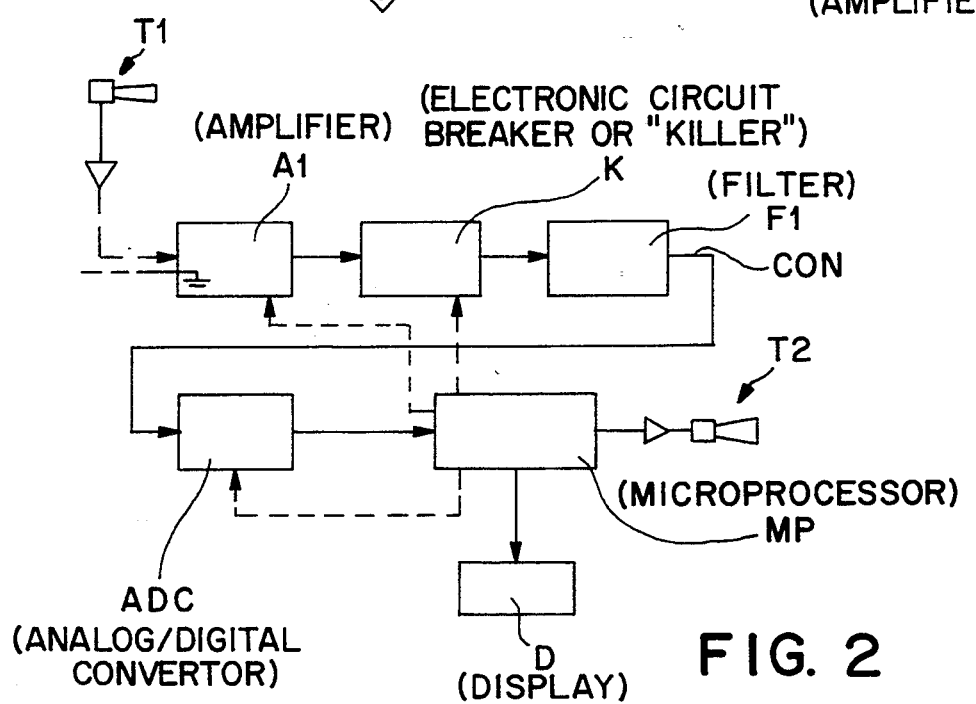
FIG. 2 is a block diagram of the electronic components of the system.

FIG. 2 illustrates the electronic system which processes and uses the received signal. All of the electrical components, it should be noted, are specially designed and adapted for this application, save for horns T1 and T2, which are conventional, "off the shelf" items. The amplifier A1 amplifies the received signal from horn T1 with a gain (G) set by a microprocessor MP and sends it to the circuit "killer" K, always controlled by a microprocessor MP. K is a circuit containing a system of electronic breakers, controlled by the microprocessor MP, which serve to cut the echoes of the received signal and impart a proper shape to the reception burst in order to use it for the temporary and relative control of same circuit. The use of a breaker system in K is new and original as it cuts the received signals without generating transients (K conveniently shifts the zero line and temporarily extends the fronts so that the band-pass filter cuts out said fronts); the zero line works on starting, while the front extension works on the queues. K also contains an automatic gain control system to prevent signal saturation pre- and post-filter. Once in operation, the circuit K closes 1 ms before the arrival of the signal and opens after 6 ms, thanks to an iterating calculation accomplished by the microprocessor. The signal so cut enters the band-pass filter FI, a band-pass filter of very high stability and very narrow band, narrowly bracketing the frequency of the emission through which only the fundamental harmonic can pass and leaves in the already described fish shaped amplitude-time diagram. The signal is converted from an analog to a digital form by the ADC acquisition circuit a high velocity analog/digital converter and is sent to a microprocessor MP for processing. We will not describe the various functions of the conductors CON since these are self evident to an expert in the field.

MP is a microprocessor which operates the entire system. It generates the single frequency emission signal, pilots and controls the current to the emitter horn T2 as well as controlling the electronic circuit breaker "killer" K. It also operates the digital conversion (ADC) of the signal coming from filter FI, calculates the "time of flight", and shows it on display D. The microprocessor MP processes the data, finds the maximum of the relative maximums of the aforementioned "fish" diagram and determines transfer time, also as a function of the moment in which the signal is emitted and generated itself by means of horn T2, and sends it to the display D. Furthermore it proceeds with the iterating cycle and sets the time of closure for the circuit K. The microprocessor MP shall always find the same maximum.

If the instant which corresponds to the above mentioned absolute maximum of the "fish" is Tmax, the instant of closure for circuit killer K is calculated as:

$$T_{kp} T_{max'\ p-1} - KS \qquad (1)$$

where:

$T_{max'}\ p-1$ is calculated on the iterative cycle which precedes the one on which $T_{kp}$ is calculated;

p is the iterative cycle second number;

KS is an appropriate constant that depends on a factor of quality (Q) of the filters, on the number of poles of the filters and on the number n of waves of the received signal which one wants to enter the band-pass filter.

In order to perform a more sophisticated killer setting the following relationship may be used:

$$T_{kp} T_{k'\ p-2} + \eta(T_{k'\ p-1} - T_{k'\ p-2}) - KS \qquad (2)$$

where:

p is the iterative cycle number and $\eta$ is the error percentage used in the control.

If $\eta = 1$, relationship (1) and (2) are identical.

Figure 3:
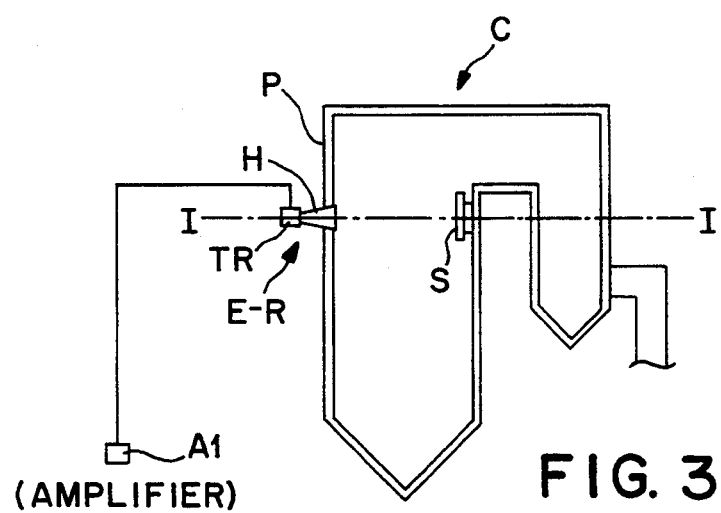
FIG. 3 is a diagrammatic representation of a second way of implementing the system.

FIG. 3 shows how the invented system can be alternatively implemented using a single horn acting as an emitter unit which also functions as a receiver, utilizing an opposite reflective surface (similar in concept to radar), so also obtaining a notable simplification of the apparatus. Such a unit could be for example a horn E-R made up of a suitable transducer associated with an appropriate speaker, transducer TR or transducers associated with an appropriate speaker or true horn H an emitter and a receiver, mounted on a wall P of a heater C. On the opposite wall, instead of horn T1 as shown in FIG. 1 a signal pick-up device S is installed, that is able to pick up the signal transmitted from the horn E-R and to send it back to the latter. As the figure shows, the pick-up device can simply be an acoustically reflective surface S. Obviously the horn E-R will be associated with the electronic system A1, already illustrated with reference to FIG. 2. It is also obvious that two distinct horns could be installed adjacent, on the same wall P of the heater C to perform, respectively, the function of emitter and receiver, a pick-up device S again to be installed on the opposite wall.

I claim:

1. A system for measuring the transfer time of a sound wave in a gas, the velocity of said sound wave in the gas and thus the temperature of the gas using the relation between the temperature of the gas and the velocity at which said sound wave propagates through the gas, and, to this purpose, consisting of a current controlled emitter (T2) stimulated by a first electric signal to generate sound at a specific point in the gas, a receiver (T1) to receive said sound after the sound has traveled a given distance through the gas, a transducer for converting said sound into a second electric signal, a means of comparing said first and second electrical signals by means of a suitable algorithm and thus defining the transfer time of said sound, an indicator of the temperature of said gas being a function of the transfer time, wherein:

the current controlled emitter (T2), generates a sound of coherent phase and substantially of a single or a group of frequencies; the receiver (T1) is followed by a self-correlating decoder, both associated to said emitter in order to send the sound received to a band-pass filter system with narrow band and extremely high stability FI; said system further comprising an electronic circuit breaker (K), that acts on the signal entering the filter system FI and which is driven by a microprocessor (MP) by means of an iterating algorithm so as to allow always a pre-set number of n first waves of the signal entering the filter system (FI); and wherein the signal out-going from the filter system FI forms a Hamming wave shape within a Time-Amplitude diagram, which is processed by said microprocessor (MP) in order to find the absolute maximum of the oscillations making up said Hamming wave shape, so as to determine therefrom the transfer time and, by reference to known characteristics of the gas, calculate the temperature of the gas.

2. A system according to claim 1 wherein said emitter T2 is a horn which emits sound in the form of a sinusoid wave train; said receiver T1 is a horn which receives the sound emitted by the emitter and which comprises a transducer which converts the sound received by said receiver into said second electric signal; an amplifier A1 that amplifies said second electric signal with a gain set by a microprocessor MP; the electronic circuit breaker or "killer" (K) receives the amplified second electrical signal and cuts it in order to send it through the band-pass filter system FI which allows only the fundamental harmonic portion of the signal to pass; and further comprising a data acquisition circuit in the form of an analog/digital convertor (ADC) which converts said fundamental harmonic portion of the signal from its analog to its digital form and sends the converted signal to said microprocessor (MP) which processes the data received, finds the absolute maximum of the Hamming wave shape and calculates the transfer time as a function of the moment of emission of the emitted signal; and also comprising a display (D) associated to said microprocessor (MP) to show the transfer time and temperature of the gas as calculated by the microprocessor.

3. A system according to claim 2, wherein said microprocessor (MP) calculates the moment $T_{k,p}$ at which said circuit killer (K) closes, using the relationship $T_{k,p} = T_{max'\ p-1} - KS$, where $T_{k,p}$ is a measure at cycle p, in other words the $p^{th}$ cycle, $T_{k,p}$ being the opening time at the $p^{th}$ cycle, $T_{max'\ p-1}$ is the point in time corresponding to the absolute maximum of the $(p-1)^{th}$ measuring cycle, and KS is a constant which depends on the quality factor (Q) and on the number of poles the band-pass filter system (FI) has, and on the number n of signal waves of the signal one has chosen to allow into said filter system.

4. ) A system according to claim 2, wherein said microprocessor (M ) calculates the point in time $T_{k,p}$ at which said circuit killer (K) closes, using the relationship $$i\ T_{k,p} = T_{max'\ p-2} + \eta(T_{max'\ p-1} - T_{max'\ p-2}) - KS,$$

$\eta$ being the error percentage used in the control, where $T_{k,p}$ is a measure at cycle p, in other words the $p^{th}$ cycle, $T_{k,p}$ being the opening time at the $p^{th}$ cycle, $T_{max'\ p-2}$ is the point in time corresponding to the absolute maximum of the $(p-2)^{th}$ measuring cycle, KS is a constant which depends on the quality factor (Q) and on the number of poles the band-pass filter system (FI) has, and on the number n of signal waves of the signal one has chosen to allow into said filter system , and $\eta$ is the convergence constant of the iterating calculation, i.e. the error percentage used in the control, which determines the setting of the electronic circuit breaker.

5. A system according to claim 1, in that the sound emitting and receiving functions are performed in which the emitter (T2) and receiver (T1) are combined into a single emitter-receiver device (E-R) which emits the sound and receives it back after said sound has been picked up and sent back by a signal detector (S).

* * * * *

UNITED STATES PATENT AND TRADEMARK OFFICE
CERTIFICATE OF CORRECTION

PATENT NO.: 5,437,506

DATED: August 1, 1995

INVENTOR(S): GRAY, Antonio

It is certified that error appears in the above-identified patent and that said Letters Patent is hereby corrected as shown below:

Column 6, claim 4, line 23, "(M)" should be --(MP)--.

Column 6, claim 4, line 27, delete "i" preceeding the equation.

Signed and Sealed this

Third Day of October, 1995

*Attest:*

BRUCE LEHMAN

*Attesting Officer*     Commissioner of Patents and Trademarks